US009671058B2

(12) United States Patent
Wang et al.

(10) Patent No.: US 9,671,058 B2
(45) Date of Patent: Jun. 6, 2017

(54) ROTATING MECHANISM USED FOR ROTATING A SCREEN AND DISPLAY DEVICE THEREWITH

(71) Applicant: Wistron Corporation, New Taipei (TW)

(72) Inventors: Wei Wang, New Taipei (TW); Shao Bo Peng, New Taipei (TW); Jitao Li, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/937,824

(22) Filed: Nov. 10, 2015

(65) Prior Publication Data
US 2016/0345450 A1 Nov. 24, 2016

(30) Foreign Application Priority Data

May 21, 2015 (CN) .......................... 2015 1 0262926

(51) Int. Cl.
| | | |
|---|---|---|
| G06F 1/16 | (2006.01) | |
| F16M 11/24 | (2006.01) | |
| F16M 11/20 | (2006.01) | |

(52) U.S. Cl.
CPC ......... *F16M 11/24* (2013.01); *F16M 11/2014* (2013.01); *F16M 2200/024* (2013.01)

(58) Field of Classification Search
CPC .............................. H05K 5/0234; G06F 1/16
See application file for complete search history.

(56) References Cited

U.S. PATENT DOCUMENTS

| | | | | |
|---|---|---|---|---|
| 7,854,422 B2 * | 12/2010 | Kameoka | ............... | F16M 11/08 248/349.1 |
| 7,866,615 B2 | 1/2011 | Hsuan | | |
| 2002/0060899 A1 * | 5/2002 | Bang | ...................... | F16M 11/00 361/679.6 |
| 2006/0203436 A1 * | 9/2006 | Hwang | .................. | F16M 11/00 361/679.21 |
| 2008/0035821 A1 * | 2/2008 | Kameoka | ............... | F16M 11/08 248/349.1 |

FOREIGN PATENT DOCUMENTS

| | | |
|---|---|---|
| CN | 2610455 Y | 4/2004 |
| TW | 200933064 | 8/2009 |

OTHER PUBLICATIONS

Office action mailed/issued on Jul. 21, 2016 for TW application No. 104120245, filing date: Jun. 24, 2015, p. 2 line 4-26, p. 3 and p. 4 line 1-8.

* cited by examiner

*Primary Examiner* — Anthony Q Edwards
(74) *Attorney, Agent, or Firm* — Winston Hsu

(57) ABSTRACT

A rotating mechanism used for rotating a screen includes a supporting stand and a base. An end of the supporting stand is connected to the screen. The supporting stand is for supporting the screen. The base is placed on a supporting surface, so as to support the supporting stand and the screen on the supporting surface. The other end of the supporting stand is fixed on the base. The base includes a first cover and a second cover. The other end of the supporting stand is connected with the first cover. The second cover is detachably installed on the first cover and contacts with the supporting surface. At least one of the first cover and the second cover is rotatable relative to the supporting surface.

26 Claims, 19 Drawing Sheets

ROTATING MECHANISM USED FOR ROTATING A SCREEN AND DISPLAY DEVICE THEREWITH

BACKGROUND OF THE INVENTION

1. Field of the Invention

The present disclosure relates to a rotating mechanism and a display device therewith, and more particularly, to a rotating mechanism with enhanced structural strength and a display device therewith.

2. Description of the Prior Art

Please refer to FIG. 1 to FIG. 3. FIG. 1 is a schematic diagram of a rotating mechanism 8 in the prior art. FIG. 2 is a partial enlarged diagram of an end of a supporting stand 82 of the rotating mechanism 8 in the prior art. FIG. 3 is a diagram of a base 80 of the rotating mechanism 8 in the prior art. As shown in FIG. 1 to FIG. 3, the rotating mechanism 8 includes the base 80, the supporting stand 82, and a rotating plate 84. The supporting stand 82 is configured to be rotatable relative to the base 80, so as to rotate a screen. More specifically, the rotating plate 84 is installed on a bottom of the supporting stand 82. The rotating plate 84 includes a positioning plate 841 and an inner plate 843, which are rotatable relative to each other and disposed coaxially with the supporting stand 82. A plurality of positioning holes 8410 is formed on the positioning plate 841. A plurality of positioning protrusions 801 is disposed on the base 80 and corresponding to the plurality of positioning holes 8410. When the positioning plate 841 is installed on the base 80, the positioning protrusion 801 engages with the corresponding positioning hole 8410. When it is desired to rotate a screen, since the positioning protrusions 801 engage with the positioning holes 8410, the positioning plate 841 is fixed on the base 80 and restrained from rotating relative to the base 80. Therefore, the supporting stand 82 drives the inner plate 842 to rotate relative to the positioning plate 841 and the base 80, so as to rotate the screen.

As technology advances, a conventional desktop computer is gradually replaced with an All-in-One PC integrating with various electronic components, such as a processor, a motherboard, a hard drive, a screen, a speaker, a camera, and etc. Therefore, the weight of the All-in-One PC is much more than the one of the conventional desktop computer. When the rotating mechanism 8 is adapted for rotating the screen of the All-in-One PC, the positioning protrusion 801 will receive an excessive force because the screen of the All-in-one PC is much heavier than the screen of the conventional desktop computer, which may cause the positioning protrusion 801 to be damaged and to partially lose the rotating function.

Therefore, it becomes an important topic in the field to improve service life and structural strength of a rotating mechanism used for the screen.

SUMMARY OF THE INVENTION

It is an object of the present disclosure to provide a rotating mechanism used for rotating a screen, and a display device therewith, so as to solve the above-mentioned problems.

In order to achieve the aforementioned object, a rotating mechanism used for rotating a screen includes a supporting stand and a base. A first end of the supporting stand is connected to the screen. The supporting stand supports the screen. The base is placed on a supporting surface for supporting the supporting stand and the screen on the supporting surface. A second end of the supporting stand is fixed on the base. The base includes a first cover and a second cover. The second end of the supporting stand is connected to the first cover. The second cover is detachably installed on the first cover and contacts with the supporting surface. At least one of the first cover and the second cover is rotatable relative to the supporting surface.

According to an embodiment of the present disclosure, an opening is formed on the first cover, and the second end of the supporting stand passes through the opening.

Furthermore, the first cover is rotatably connected to the second cover. The second end of the supporting stand is fixed on the first cover. The rotating mechanism further includes at least one cushion installed on a side of the second cover close to the supporting surface, and the at least one cushion provides a friction force, such that the second cover is fixed on the supporting surface and restrained from rotating relative to the supporting surface when the first cover rotates relative to the supporting surface.

Furthermore, the rotating mechanism further includes a blocking column and a restraining blocking portion. The blocking column is disposed on one of the first cover and the second cover. The restraining blocking portion is disposed on the other one of the first cover and the second cover. The restraining blocking portion stops the blocking column for restraining a rotating angle between the first cover and the second cover when the second cover rotates relative to the first cover.

Furthermore, the rotating mechanism further includes an angle compensating and restraining member disposed between the first cover and the second cover. The angle compensating and restraining member includes a first engaging structure and a second engaging structure. The first engaging structure is cooperative with the blocking column, and the blocking column is installed inside the first engaging structure, such that the blocking column abuts against a side of the first engaging structure when the second cover rotates relative to the first cover. The second engaging structure is cooperative with the restraining blocking portion. The restraining blocking portion abuts against a side of the second engaging structure when the second cover rotates relative to the first cover.

Furthermore, the first cover includes a top cover and a bottom plate connected to the top cover. A circular hole is formed on the bottom plate. A circular slot is formed on the top cover and corresponding to the circular hole. The restraining blocking portion is disposed on an inner periphery of the circular slot. The second cover includes a bottom cover and a circular column connected to the bottom cover. The blocking column is disposed on an outer periphery of the circular column, and the circular column passes through the circular hole and rotatably engages with the circular slot, such that the first cover is rotatable relative to the second cover.

According to another embodiment of the present disclosure, a restraining slot is disposed on one of the first cover and the second cover. A restraining protrusion is disposed on the other one of the first cover and the second cover. When the first cover is combined with the second cover, the restraining protrusion slidably engages with the restraining slot, such that the first cover is rotatable relative to the second cover.

Specifically, the restraining slot is a partial arc structure for restraining a rotating angle between the second cover and the first cover.

According to another embodiment of the present disclosure, the second cover is rotatably connected to the first cover. The second end of the supporting stand passes through the opening to fix on the second cover. The rotating mechanism further includes at least one cushion installed on a side of the first cover close to the supporting surface. An accommodating slot is formed on a side of the first cover close to the second cover. The second cover is rotatably accommodated inside the accommodating slot, and the at least one cushion provides a friction force, such that the first cover is fixed on the supporting surface and restrained from rotating relative to the supporting surface when the second cover is rotatable relative to the supporting surface.

According to another embodiment of the present disclosure, the first cover and the second cover are fixed to each other. A hole is formed on the second cover. The rotating mechanism further includes a roller disposed between the first cover and the second cover and passing through the hole to protrude from a side of the second cover away from the first cover. The roller includes a shaft, and an axial direction of the shaft is substantially parallel to a radial direction of the first cover or the second cover.

Furthermore, the rotating mechanism further includes at least one cushion installed on a side of the second cover close to the supporting surface, and the at least one cushion provides a friction force, such that the first cover and the second cover are rotatable around the at least one cushion cooperatively and relative to the supporting surface.

Furthermore, the second cover includes a first fixing lug and a second fixing lug. An engaging hole is formed on the first fixing lug. An engaging slot is formed on the second fixing lug. A first end of the shaft engages with the engaging hole of the first fixing lug, and a second end of the shaft engages with the engaging slot of the second fixing lug.

Furthermore, the first cover includes a first rib, a second rib, a third rib, and a fourth rib. The first rib and the second rib are disposed on a side of the first cover close to the second cover and along a first direction. The third rib and the fourth rib are disposed on the side of the first cover close to the second cover and along a second direction substantially perpendicular to the first direction. The first rib and the second rib are disposed oppositely and spaced from each other in a first predetermined distance. The first predetermined distance is slightly greater than a length of the shaft of the roller for restraining a sliding displacement of the roller along the first direction when the roller rotates. The third rib and the fourth rib are disposed oppositely and spaced from each other in a second predetermined distance. The second predetermined distance is slightly greater than a diameter of the shaft of the roller for restraining a sliding displacement of the roller along the second direction when the roller rotates.

According to another embodiment, the first cover includes a first fixing lug and a second fixing lug. An engaging hole is formed on the first fixing lug. An engaging slot is formed on the second fixing lug. A first end of the shaft engages with the engaging hole of the first fixing lug, and a second end of the shaft engages with the engaging slot of the second fixing lug.

Furthermore, the second cover includes a first rib, a second rib, a third rib, and a fourth rib. The first rib and the second rib are disposed on a side of the second cover close to the first cover and along a first direction. The third rib and the fourth rib are disposed on the side of the second cover close to the first cover and along a second direction substantially perpendicular to the first direction. The first rib and the second rib are disposed oppositely and spaced from each other in a first predetermined distance. The first predetermined distance is slightly greater than a length of the shaft of the roller for restraining a sliding displacement of the roller along the first direction when the roller rotates. The third rib and the fourth rib are disposed oppositely and spaced from each other in a second predetermined distance, and the second predetermined distance is slightly greater than a diameter of the shaft of the roller for restraining a sliding displacement of the roller along the second direction when the roller rotates.

In order to achieve the aforementioned object, a display device includes a screen and a rotating mechanism connected to the screen for rotating the screen. The rotating mechanism includes a supporting stand and a base. A first end of the supporting stand is connected to the screen. The supporting stand supports the screen. The base is placed on a supporting surface for supporting the supporting stand and the screen on the supporting surface. A second end of the supporting stand is fixed on the base. The base includes a first cover and a second cover. The second end of the supporting stand is connected to the first cover. The second cover is detachably installed on the first cover and contacts with the supporting surface. At least one of the first cover and the second cover is rotatable relative to the supporting surface.

In summary, the rotating mechanism of the present disclosure utilizes the base capable of rotating relative to the supporting surface for driving the screen to rotate relative to the supporting surface. The rotating mechanism has advantages of easy operation, simple structure, and enhanced strength, which solves the problems of easy wear-out and short service life of a conventional rotating mechanism due to an overweight screen.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
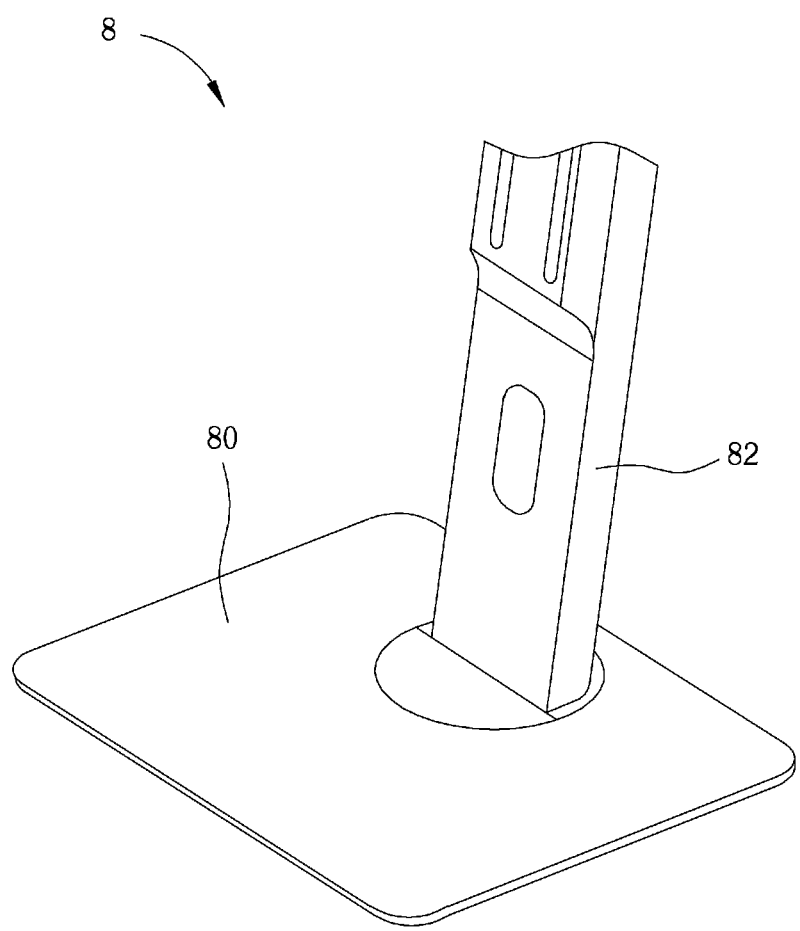
FIG. 1 is a schematic diagram of a rotating mechanism in the prior art.
Figure 2:
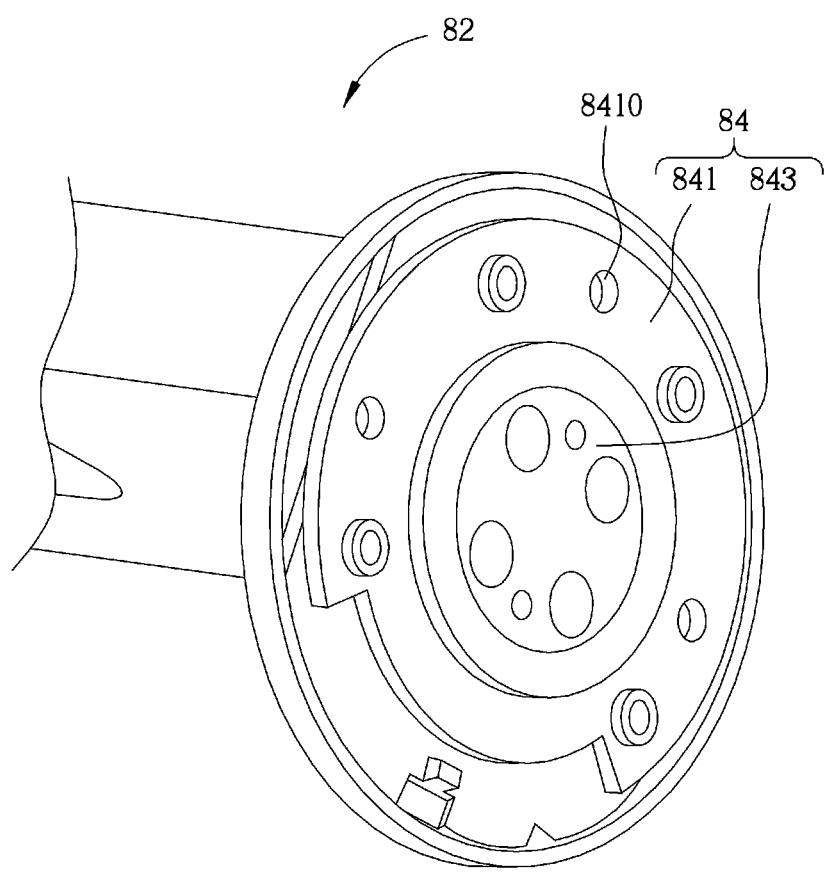
FIG. 2 is a partial enlarged diagram of an end of a supporting stand of the rotating mechanism in the prior art.
Figure 3:
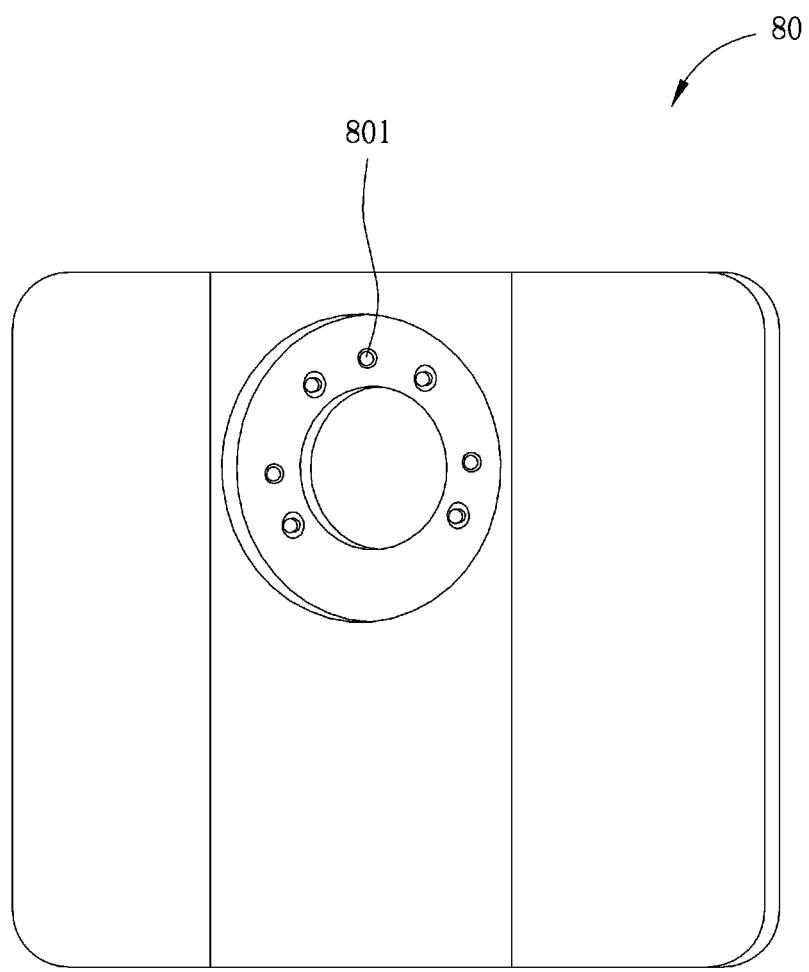
FIG. 3 is a diagram of a base of the rotating mechanism in the prior art.
Figure 4:
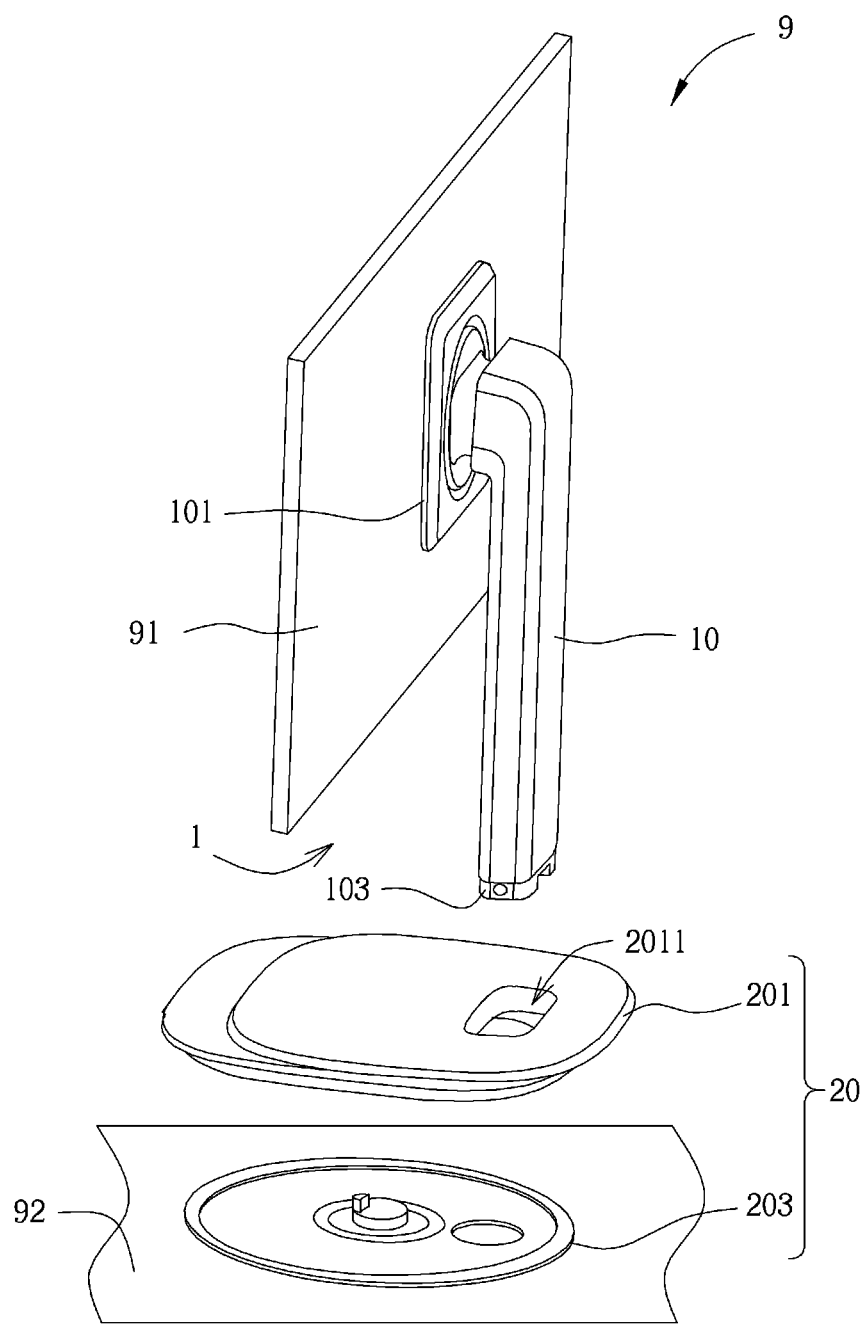
FIG. 4 is a diagram of a display device according to a first embodiment of the present disclosure.
Figure 5:
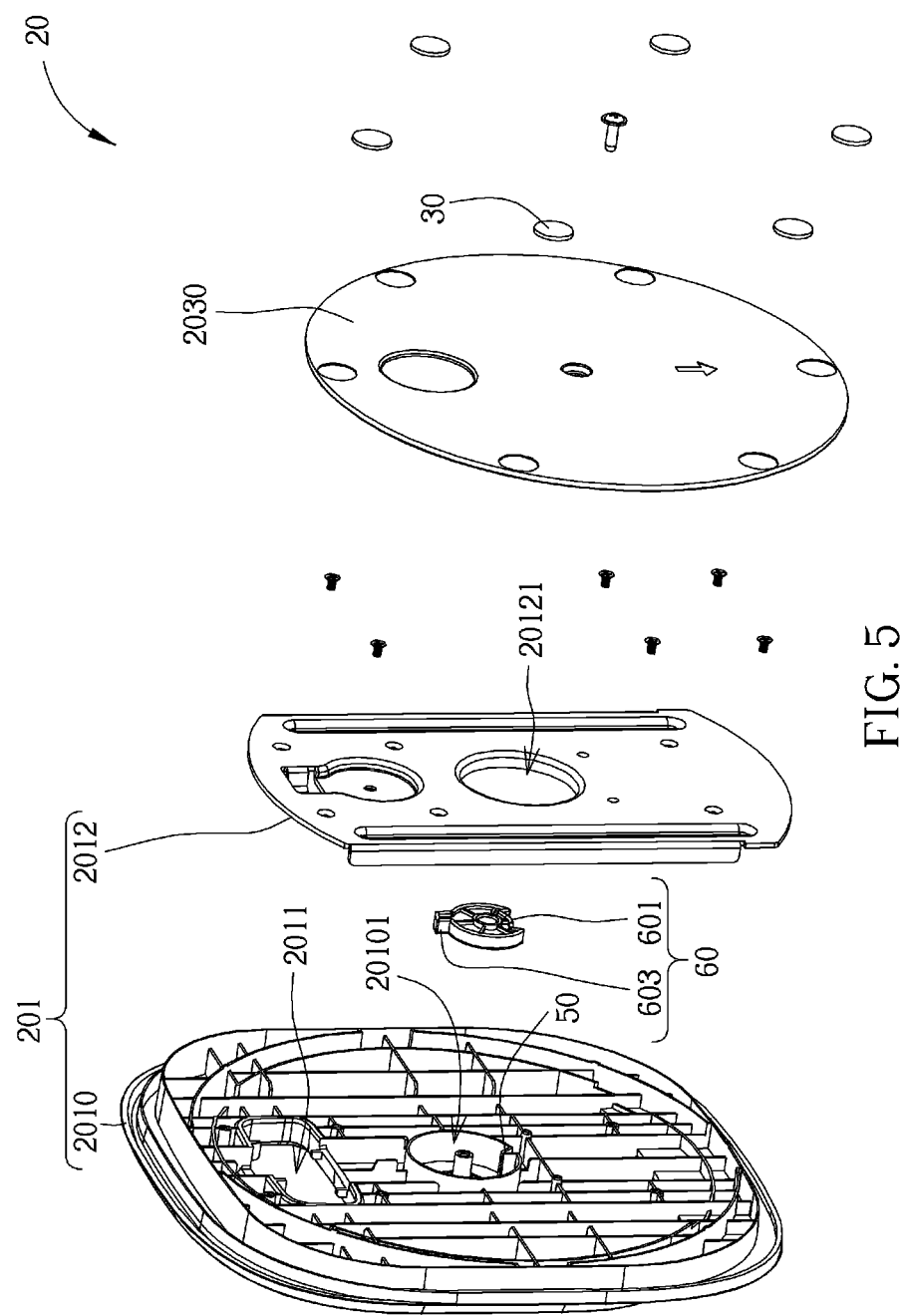
FIG. 5 is an exploded diagram of abase of a rotating mechanism of the display device according to the first embodiment of the present disclosure.
Figure 6:
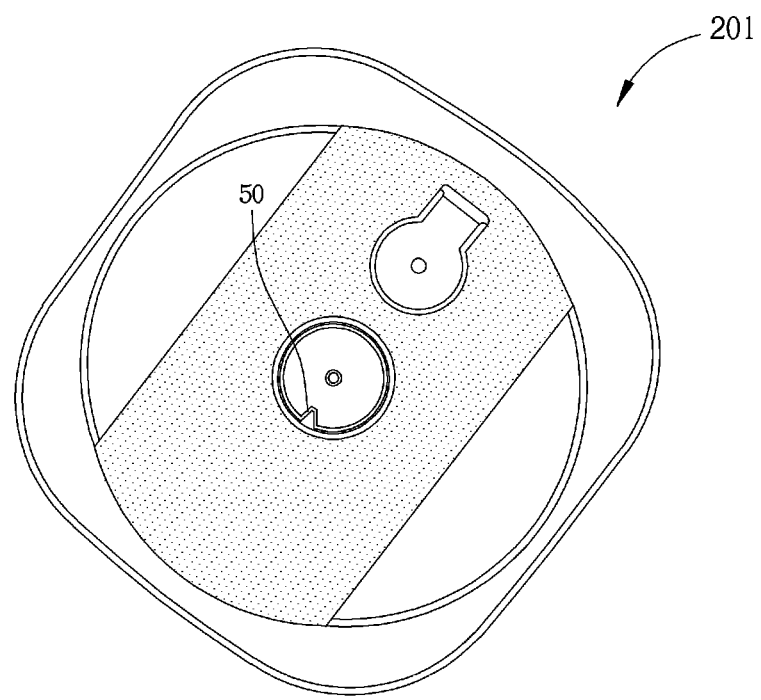
FIG. 6 is a diagram of a first cover of the rotating mechanism according to the first embodiment of the present disclosure.
Figure 7:
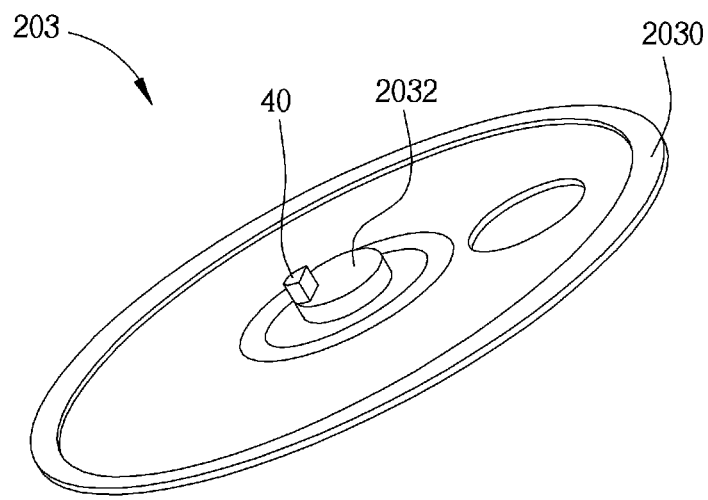
FIG. 7 is a diagram of a second cover of the rotating mechanism according to the first embodiment of the present disclosure.

Please refer to FIG. 4 to FIG. 7. FIG. 4 is a diagram of a display device 9 according to a first embodiment of the present disclosure. FIG. 5 is an exploded diagram of a base 20 of a rotating mechanism 1 of the display device 9 according to the first embodiment of the present disclosure. FIG. 6 is a diagram of a first cover 201 of the rotating mechanism 1 according to the first embodiment of the present disclosure. FIG. 7 is a diagram of a second cover 203 of the rotating mechanism 1 according to the first embodiment of the present disclosure. As shown in FIG. 4 to FIG. 7, the display device 9 of the present disclosure includes a screen 91 and the rotating mechanism 1. The rotating mechanism 1 is connected to the screen 91 for rotating the screen 91. The rotating mechanism 1 includes a supporting stand 10 and the base 20. A first end 101 of the supporting stand 10 is connected to the screen 91. The supporting stand 10 supports the screen 91. The base 20 is placed on a supporting surface 92 for supporting the supporting stand 10 and the screen 91 on the supporting surface 92. A second end 103 of the supporting stand 10 is fixed on the base 20. The base 20 includes the first cover 201 and the second cover 203. An opening 2011 is formed on the first cover 201. The second end 103 of the supporting stand 10 passes through the opening 2011 to be fixed on the first cover 201. The second cover 203 is detachably installed on the first cover 201 and contacts with the supporting surface 92. In this embodiment, the first cover 201 is rotatable relative to the supporting surface 92. Specifically, the first cover 201 is rotatably connected the second cover 203. The rotating mechanism 1 further includes at least one cushion 30 installed on a side of the second cover 203 close to the supporting surface 92. The cushion 30 provides a friction force, such that the second cover 203 is fixed on the supporting surface 92 and restrained from rotating relative to the supporting surface 92 when the first cover 201 rotates relative to the supporting surface 92.

Furthermore, the rotating mechanism 1 further includes a blocking column 40, a restraining blocking portion 50, and an angle compensating and restraining member 60. The blocking column 40 is disposed on one of the first cover 201 and the second cover 203. The restraining blocking portion 50 is disposed on the other one of the first cover 201 and the second cover 203. In this embodiment, the blocking column 40 is disposed on the second cover 203, and the restraining blocking portion 50 is disposed on the first cover 201. The restraining blocking portion 50 stops the blocking column 40 for restraining a rotating angle between the first cover 201 and the second cover 203 when the second cover 203 rotates relative to the first cover 201. The angle compensating and restraining member 60 is disposed between the first cover 201 and the second cover 203. The angle compensating and restraining member 60 includes a first engaging structure 601 and a second engaging structure 603. The first engaging structure 601 is cooperative with the blocking column 40, and the blocking column 40 is installed inside the first engaging structure 601, such that the blocking column 40 abuts against a side of the first engaging structure 601 when the second cover 203 rotates relative to the first cover 201. The second engaging structure 603 is cooperative with the restraining blocking portion 50, such that the restraining blocking portion 50 abuts against a side of the second engaging structure 603 when the second cover 203 rotates relative to the first cover 201. The first cover 201 includes a top cover 2010 and a bottom plate 2012 connected to the top cover 2010. A circular hole 20121 is formed on the bottom plate 2012. A circular slot 20101 is formed on the top cover 2010 and corresponding to the circular hole 20121. The restraining blocking portion 50 is disposed on an inner periphery of the circular slot 20101. The bottom plate 2012 can be made of metal material for enhancing an overall structural strength of the first cover 201. The second cover 203 includes a bottom cover 2030 and a circular column 2032 connected to the bottom cover 2030. The blocking column 40 is disposed on an outer periphery of the circular column 2032. The circular column 2032 passes through the circular hole 20121 and rotatably engages with the circular slot 20101 so as to be a rotating axis, such that the first cover 201 is rotatable around the rotating axis relative to the second cover 203. It should be noted that, in this embodiment, the first engaging structure 601 can be a recessing structure, and the second engaging structure 603 can be a protruding structure. However, it is not limited to this embodiment. For example, alternatively, the first engaging structure 601 also can be a recessing structure, and the second engaging structure 603 also can be a protruding structure. It depends on practical design demands.

Figure 8:
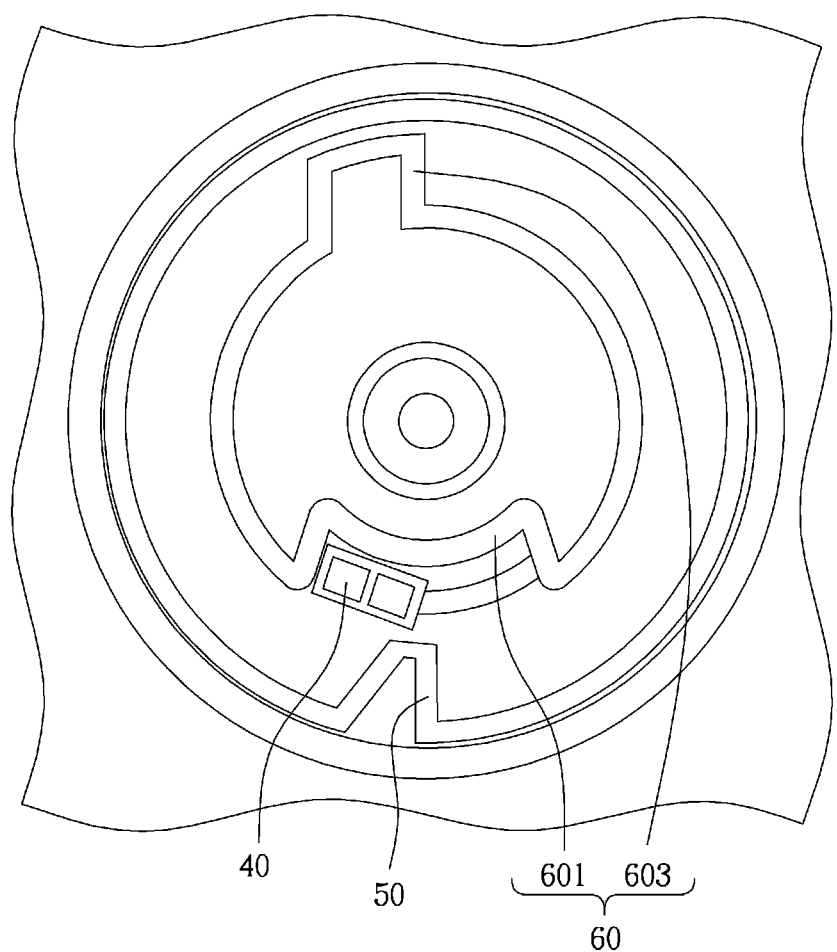
FIG. 8 to FIG. 11 are diagrams illustrating a blocking column, a restraining blocking portion, and an compensating and restraining member of the rotating mechanism located at different relative positions according to the first embodiment of the present disclosure.
Figure 9:
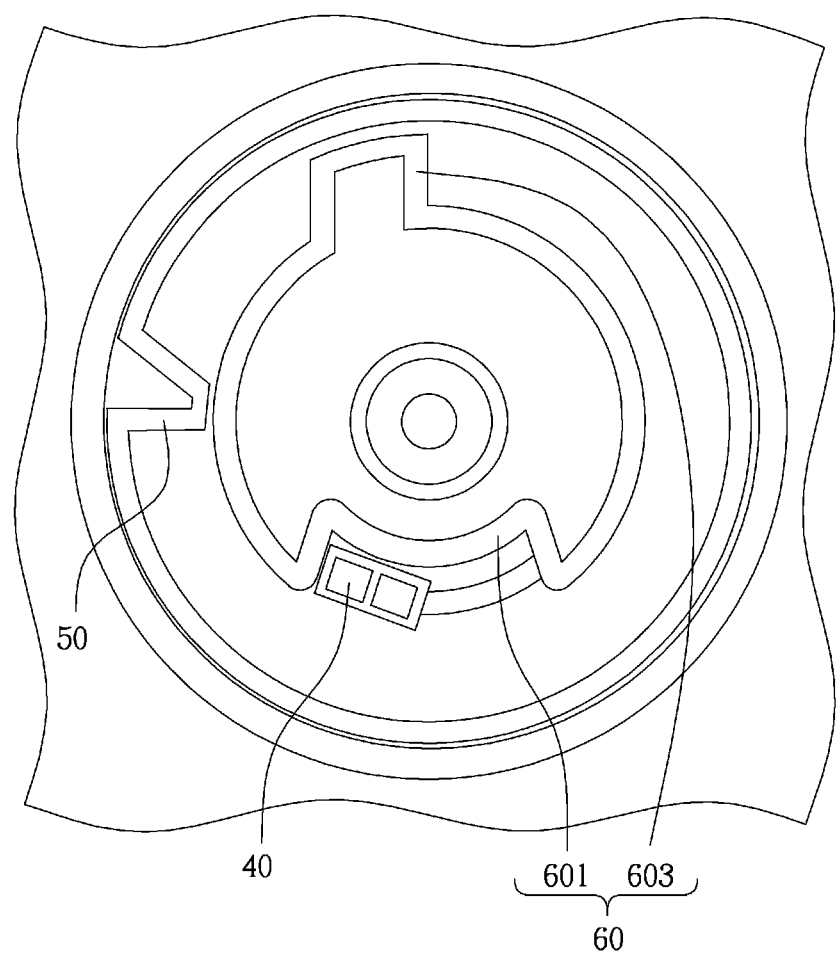
Figure 10:
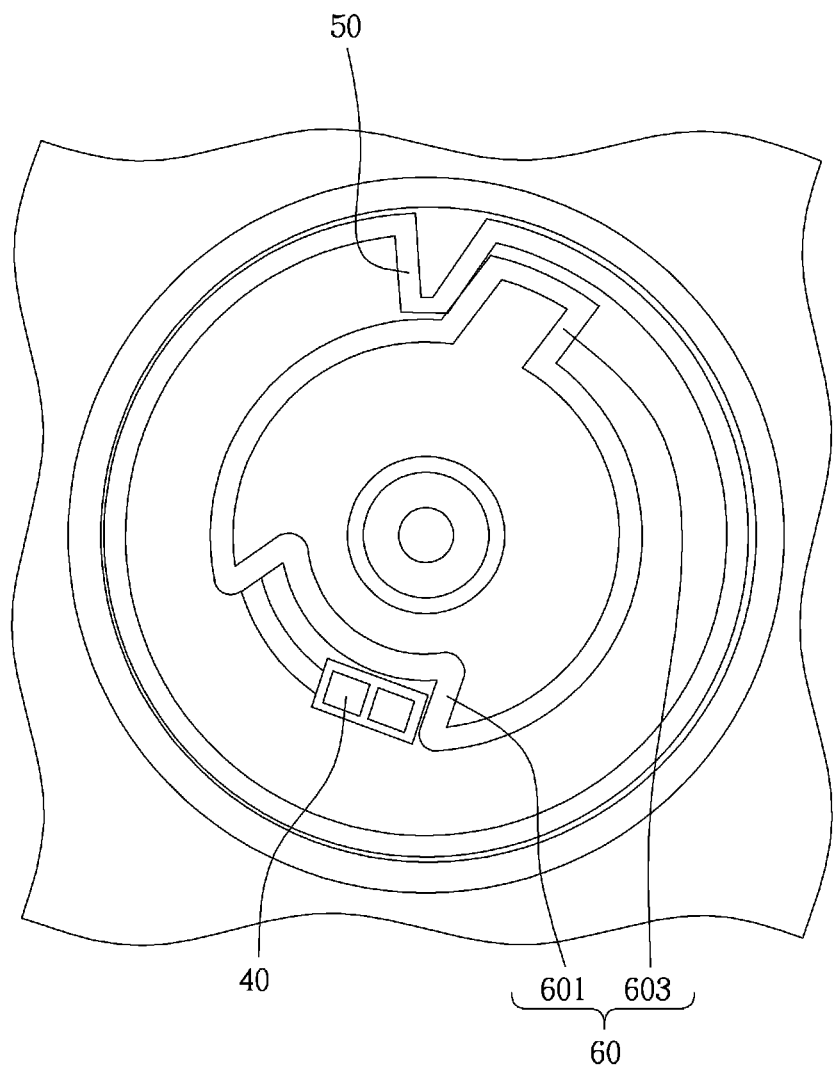
Figure 11:
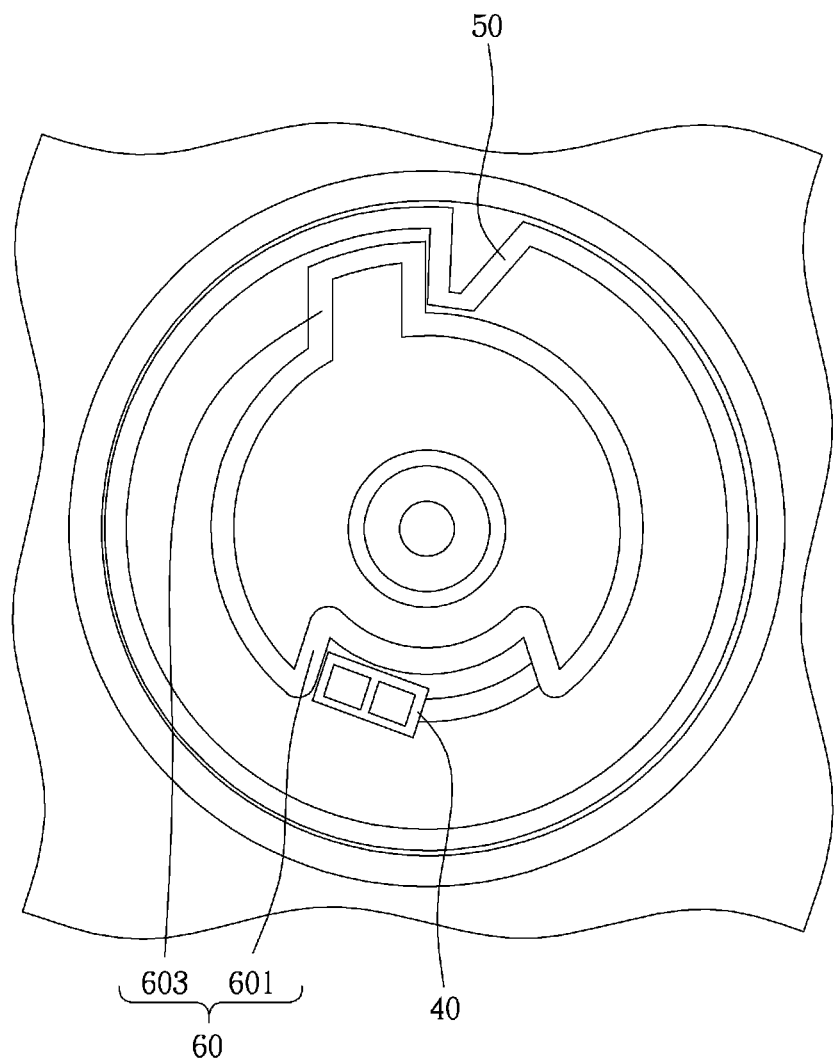

Please refer to FIG. 8 to FIG. 11. FIG. 8 to FIG. 11 are diagrams illustrating the blocking column 40, the restraining blocking portion 50, and the compensating and restraining member 60 of the rotating mechanism 1 located at different relative positions according to the first embodiment of the present disclosure. As shown in FIG. 8, when the rotating mechanism 1 is located a first position, the blocking column 40 abuts against a side of the first engaging structure 601, and the second engaging structure 603 and the restraining blocking portion 50 are located oppositely, i.e., an included angle between the second engaging structure 603 and the restraining blocking portion 50 is substantially 180 degrees. As shown in FIG. 9, when the first cover 201 rotates by 90 degrees in a clockwise direction, the rotating mechanism 1 is located at a second position, and the blocking column 40 still abuts against the side of the first engaging structure 601. At this moment, an included angle between the second engaging structure 603 and the restraining blocking portion 50 is substantially 90 degrees. When the first cover 201 rotates in the clockwise direction again, the restraining blocking portion 50 abuts against the second engaging structure 603 to push the angle compensating and restraining member 60 to rotate relative to the second cover 203 in the clockwise direction until the blocking column 40 abuts against the other side of the first engaging structure 601, as shown in FIG. 10. At this moment, the rotating mechanism 1 is located at a third position. In such a way, the rotating mechanism 1 can rotate from the first position to the third position by 180 degrees in the clockwise direction via the angle compensating and restraining member 60 without obstacle caused by structural limitation of the restraining blocking portion 50 and the second engaging structure 603. On the other hand, when the first cover 201 rotates from the first position by 180 degrees in a counterclockwise direction, the rotating mechanism 1 can rotate to a fourth position directly, as shown in FIG. 11, because the restraining blocking portion 50 and the second engaging structure 603 will not abut against each other during the aforementioned rotating process. Therefore, the rotating mechanism 1 of the present disclosure can rotate by 360 degrees without obstacle by restraining cooperation of the second engaging structure 603 and the restraining block portion 50, and the angle compensation of the first engaging structure 601 and the blocking column 40, which drives the screen 91 to rotate by 360 degrees without obstacle.

Figure 12:
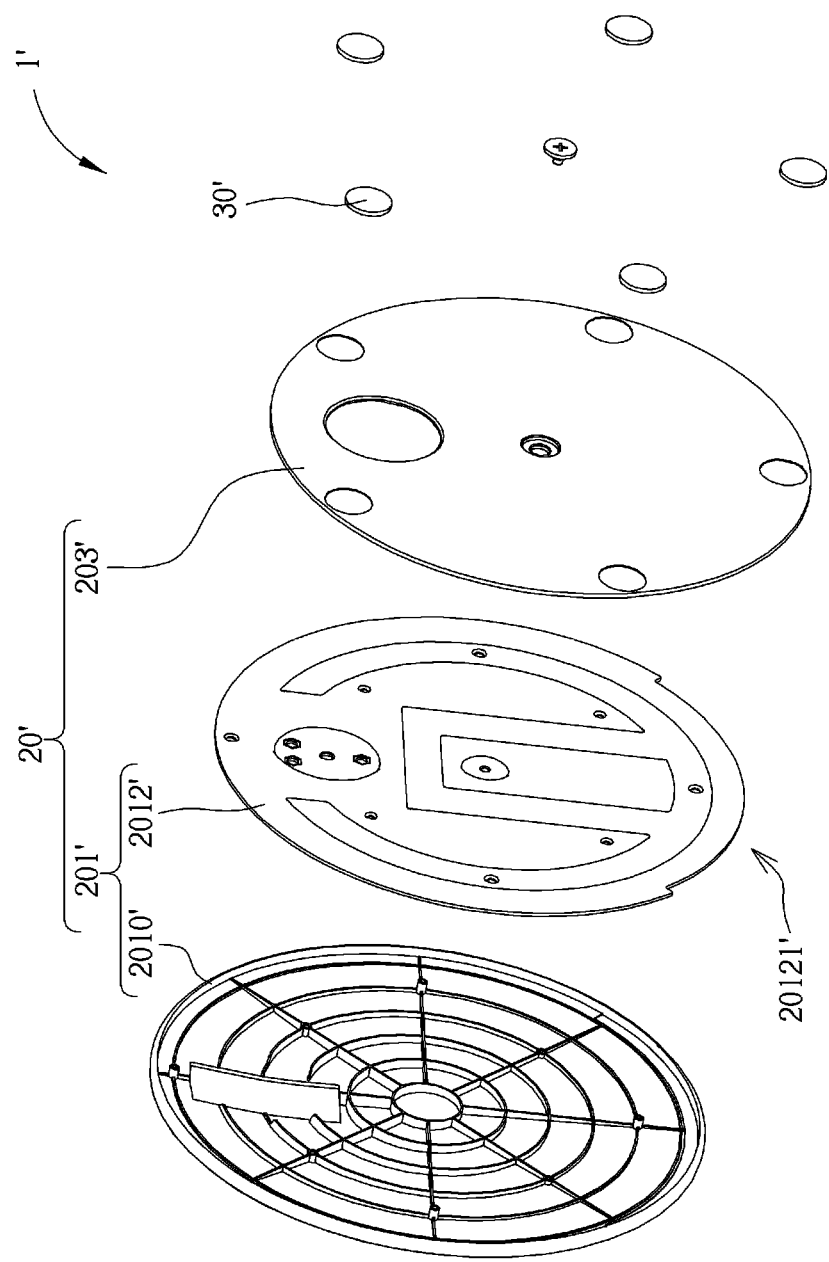
FIG. 12 is an exploded diagram of a base of a rotating mechanism according to a second embodiment of the present disclosure.
Figure 13:
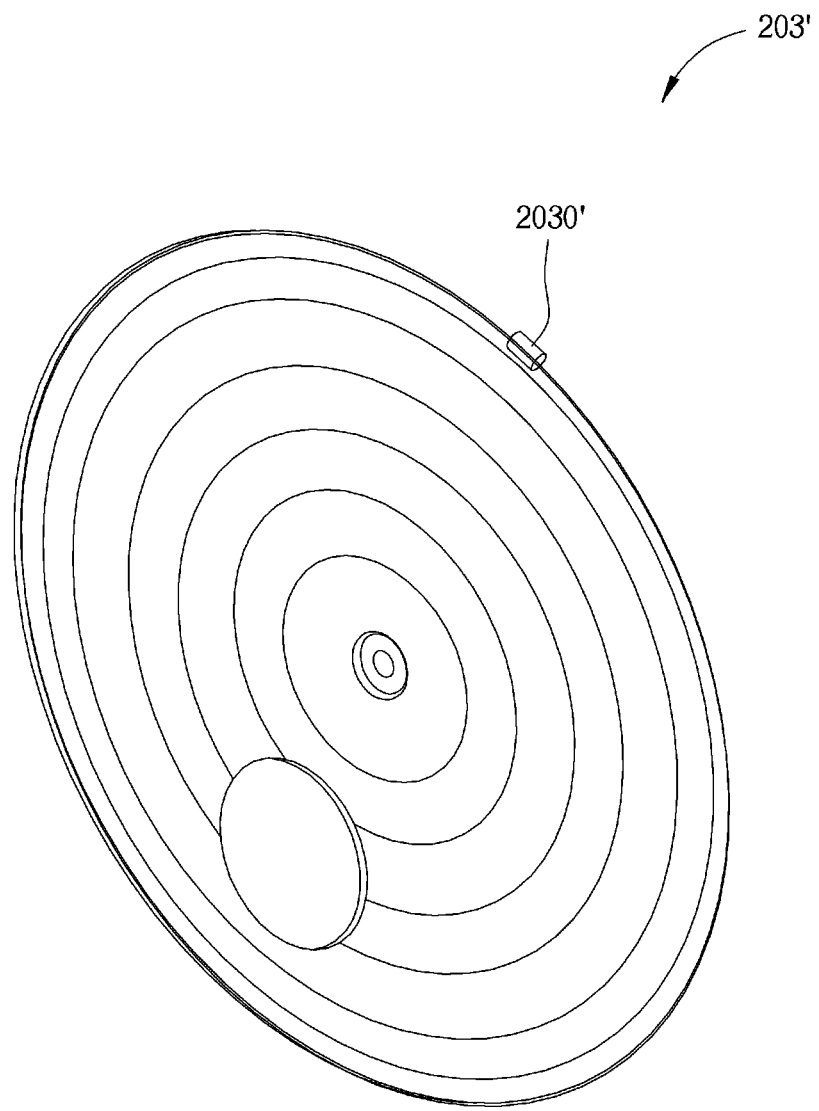
FIG. 13 is a diagram of a second cover of the rotating mechanism according to the second embodiment of the present disclosure.

Please refer to FIG. 12 and FIG. 13. FIG. 12 is an exploded diagram of a base 20' of a rotating mechanism 1' according to a second embodiment of the present disclosure. FIG. 13 is a diagram of a second cover 203' of the rotating mechanism 1' according to the second embodiment of the present disclosure. The base 20' of the rotating mechanism 1' includes a first cover 201' and the second cover 203'. The first cover 201' includes a top cover 2010' and a bottom plate 2012' combined with the top cover 2010'. The bottom plate 2012' can be made of metal material for enhancing an overall structural strength of the first cover 201'. The rotating mechanism 1' further includes at least one cushion 30' installed on a side of the second cover 203' away from the first cover 201'. The cushion 30' provides a friction force, such that the second cover 203' is fixed on the supporting surface 92 and restrained from rotating relative to the supporting surface 92 when the first cover 201' rotates relative to the supporting surface 92. The difference between the rotating mechanism 1' of the second embodiment and the rotating mechanism 1 of the first embodiment is that the a restraining slot 20121' is disposed on the bottom plate 2012' of the first cover 201', and a restraining protrusion 2030' is disposed on the second cover 203'. When the first cover 201' is combined with the second cover 203', the restraining protrusion 2030' slidably engages with the restraining slot 20121', such that the first cover 201' is rotatable relative to the second cover 203'. In this embodiment, the restraining slot 20121' can be a partial arc structure. Therefore, an arc length of the arc structure can be changed for adjusting a rotating range of the second cover 203' relative to the first cover 201'. In such a way, when the supporting stand 10 is rotated, the supporting stand 10 can drive the second cover 203' to rotate relative to the first cover 201'. That is, the restraining protrusion 2030' can slide within the restraining slot 20121', so as to rotating the screen 91.

Figure 14:
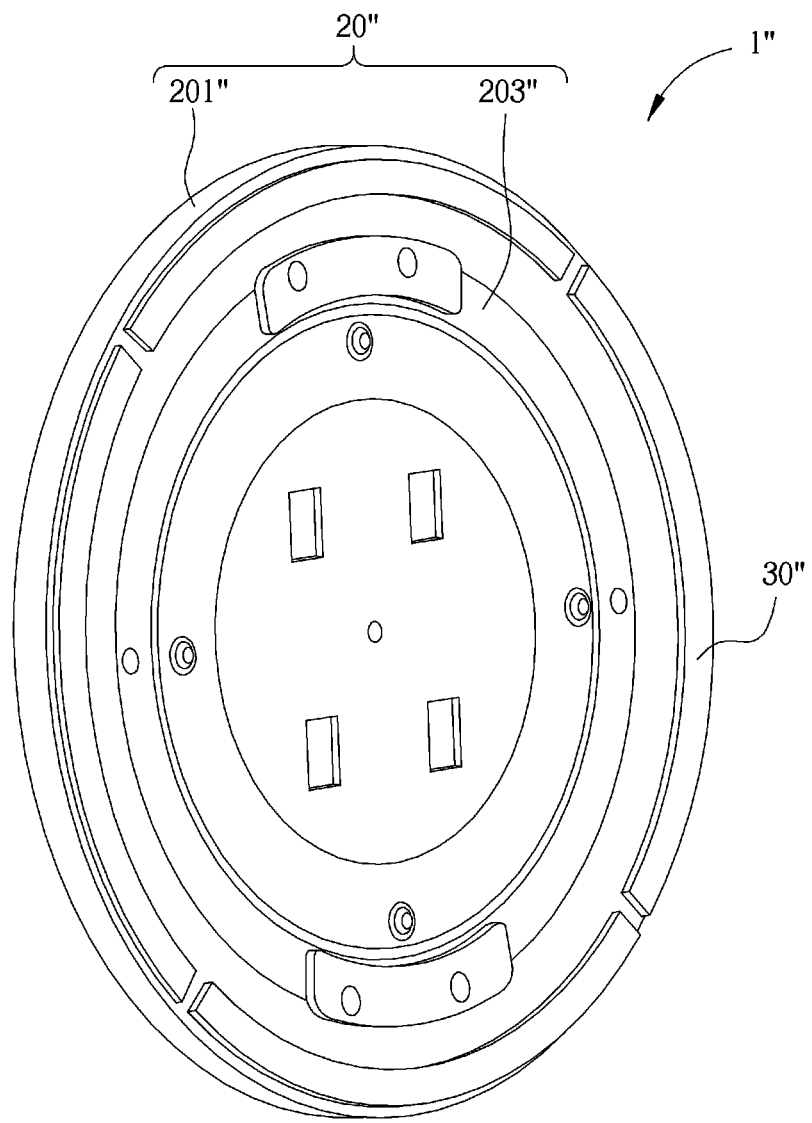
FIG. 14 is a schematic diagram of a rotating mechanism according to a third embodiment of the present disclosure.
Figure 15:
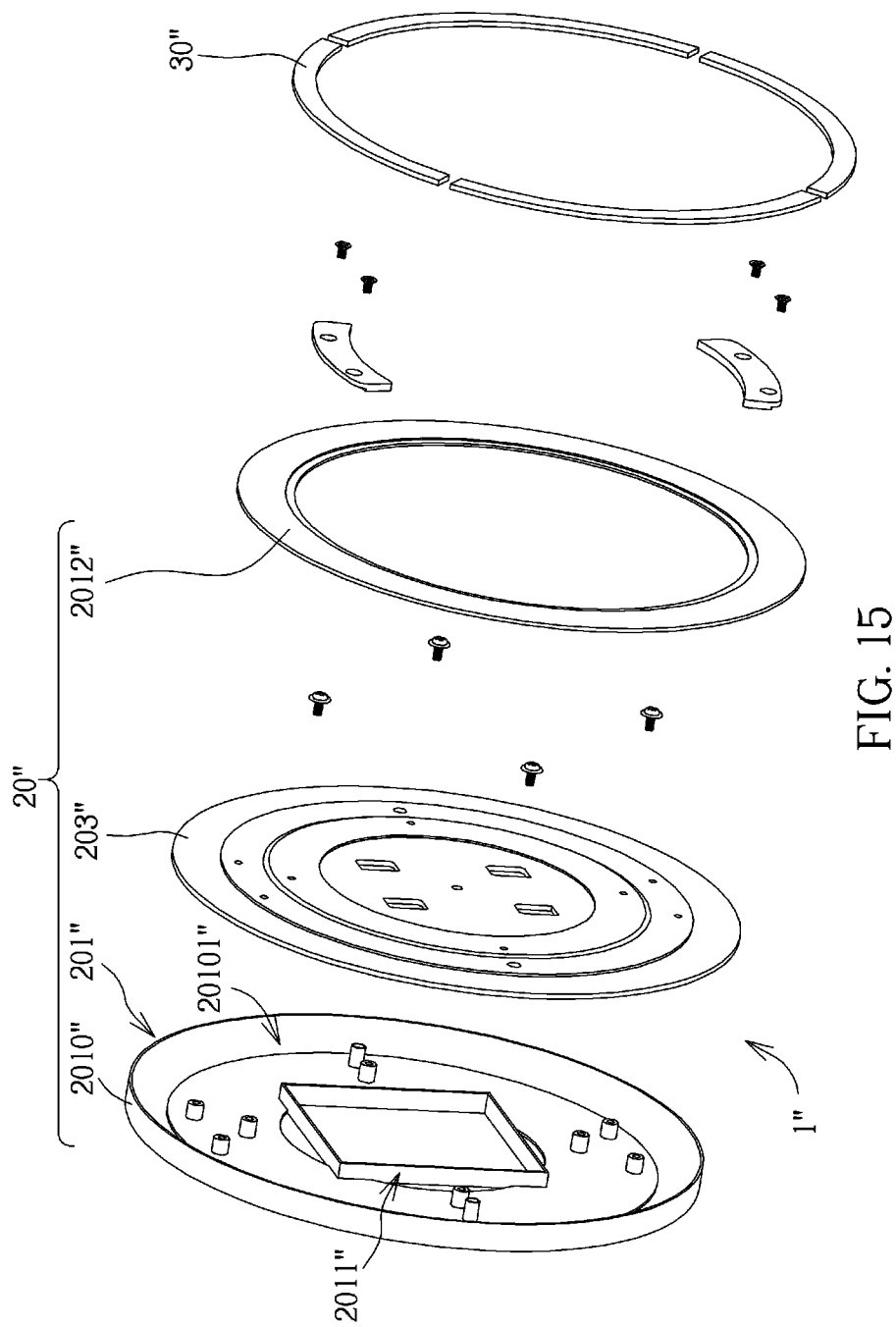
FIG. 15 is an exploded diagram of a base of the rotating mechanism according to the third embodiment of the present disclosure.

Please refer to FIG. 14 and FIG. 15. FIG. 14 is a schematic diagram of a rotating mechanism 1" according to a third embodiment of the present disclosure. FIG. 15 is an exploded diagram of a base 20" of the rotating mechanism 1" according to the third embodiment of the present disclosure. The base 20" of the rotating mechanism 1" includes a first cover 201" and a second cover 203". The first cover 201" includes a top cover 2010" and a bottom plate 2012" combined with the top cover 2010". The bottom plate 2012" can be made of metal material for enhancing an overall structural strength of the first cover 201". Different from the aforementioned rotating mechanisms 1 and 1", the first cover 201" is rotatably connected to the second cover 203", and the supporting stand 10 passes through an opening 2011" formed on the first cover 201" to be fixed on the second cover 203". The rotating mechanism 1" further includes at least one cushion 30" installed on a side of the bottom plate 2012" of the first cover 201" close to the supporting surface 92. An accommodating slot 20101" is formed on a side of the top cover 2010" of the first cover 201" close to the second cover 203". The second cover 203" is rotatably accommodated inside the accommodating slot 20101". The cushion 30" provides a friction force, such that the first cover 201" is fixed on the supporting surface 92 and restrained from rotating relative to the supporting surface 92 when the second cover 203" rotates relative to the supporting surface 92. In such a way, when the supporting stand 10 is rotated, since the first cover 201" is fixed on the supporting surface 92 by the cushion 30", the supporting stand 10 drives the second cover 203" to rotate relative to the supporting surface 92 and the first cover 201" fixed on the supporting surface 92 for rotating the screen 91.

Figure 16:
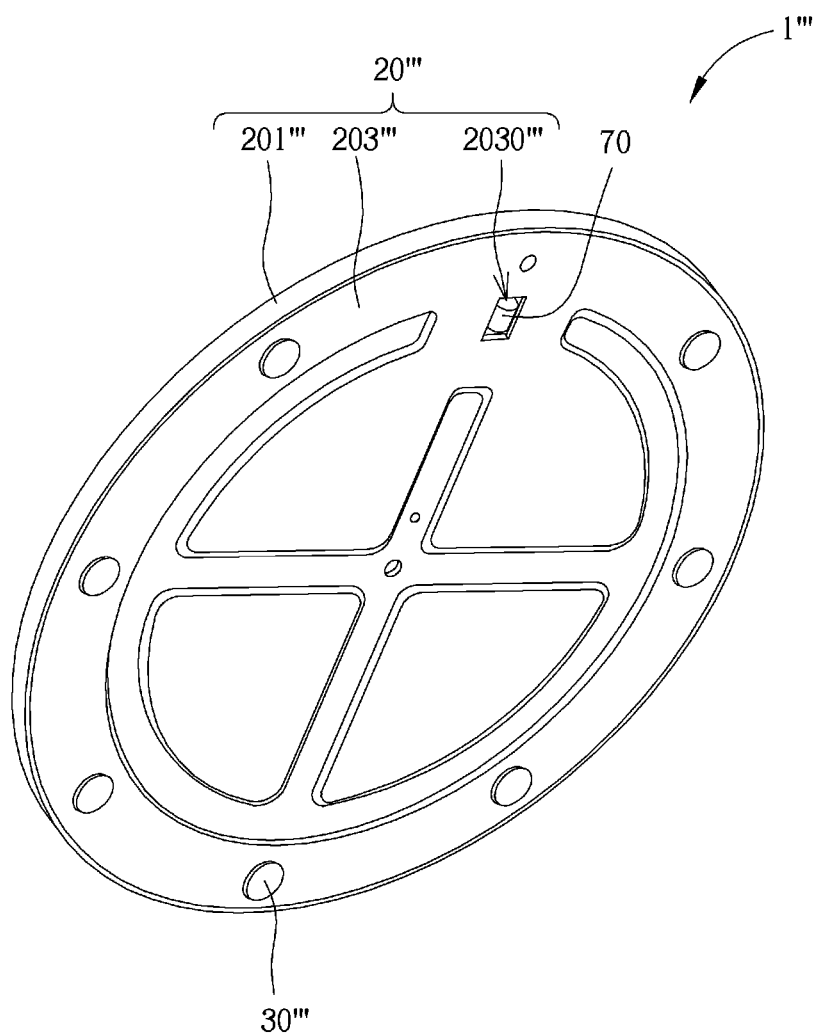
FIG. 16 is a schematic diagram of a rotating mechanism according to a fourth embodiment of the present disclosure.
Figure 17:
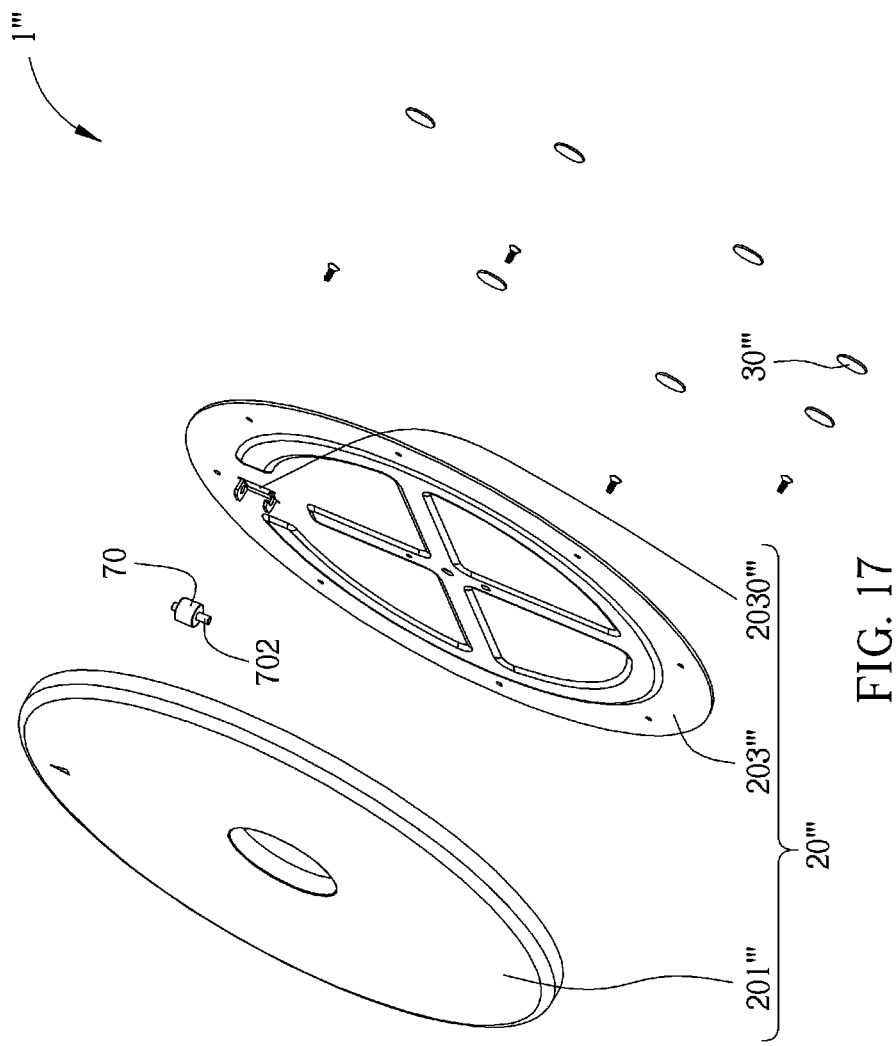
FIG. 17 is an exploded diagram of a base of the rotating mechanism according to the fourth embodiment of the present disclosure.
Figure 18:
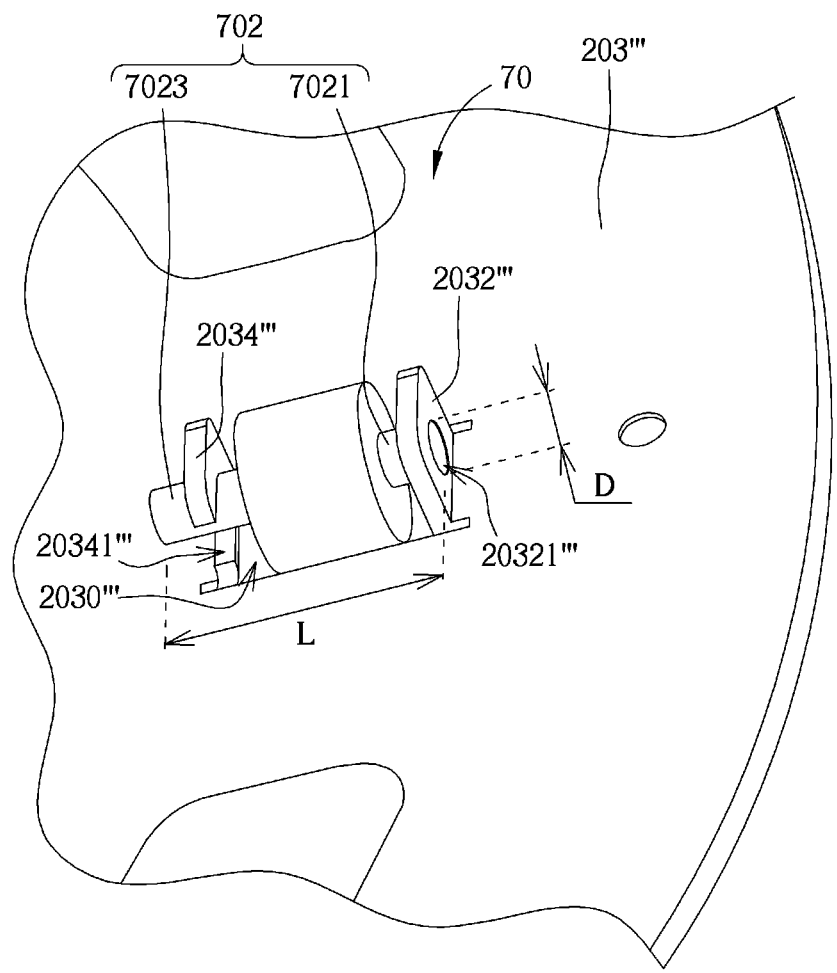
FIG. 18 is a diagram of a roller and a second cover of the rotating mechanism according to the fourth embodiment of the present disclosure.
Figure 19:
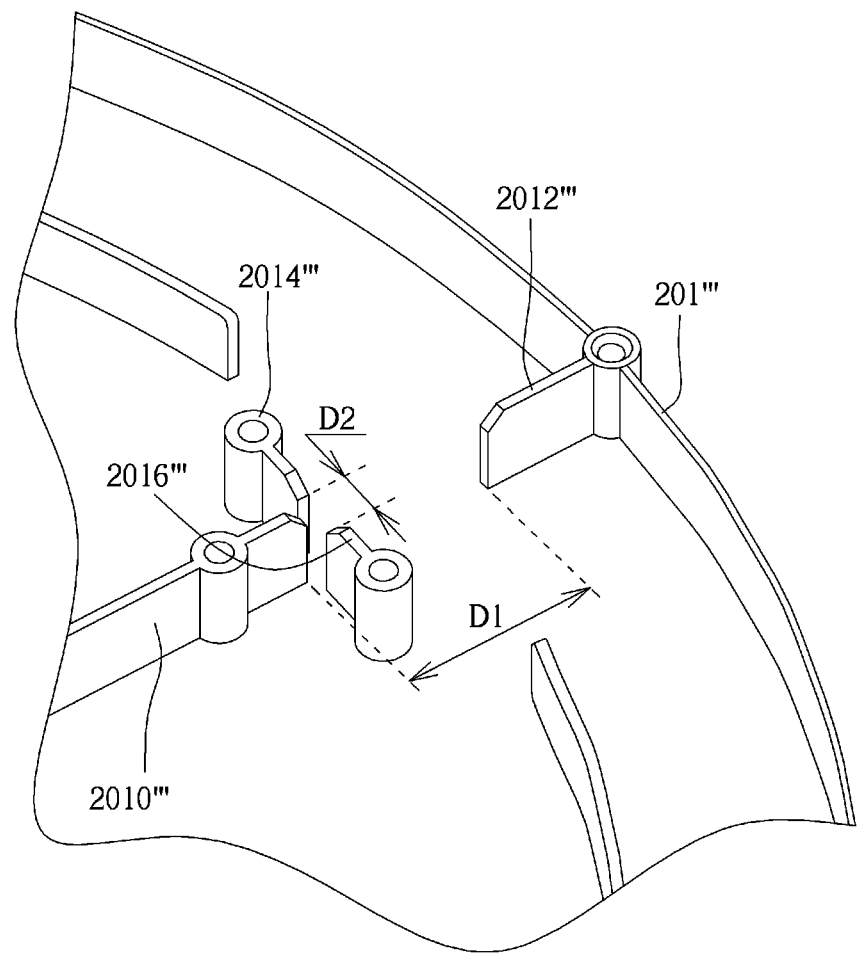
FIG. 19 is a partial enlarged diagram of a first cover of the rotating mechanism according to the fourth embodiment of the present disclosure.
Figure 20:
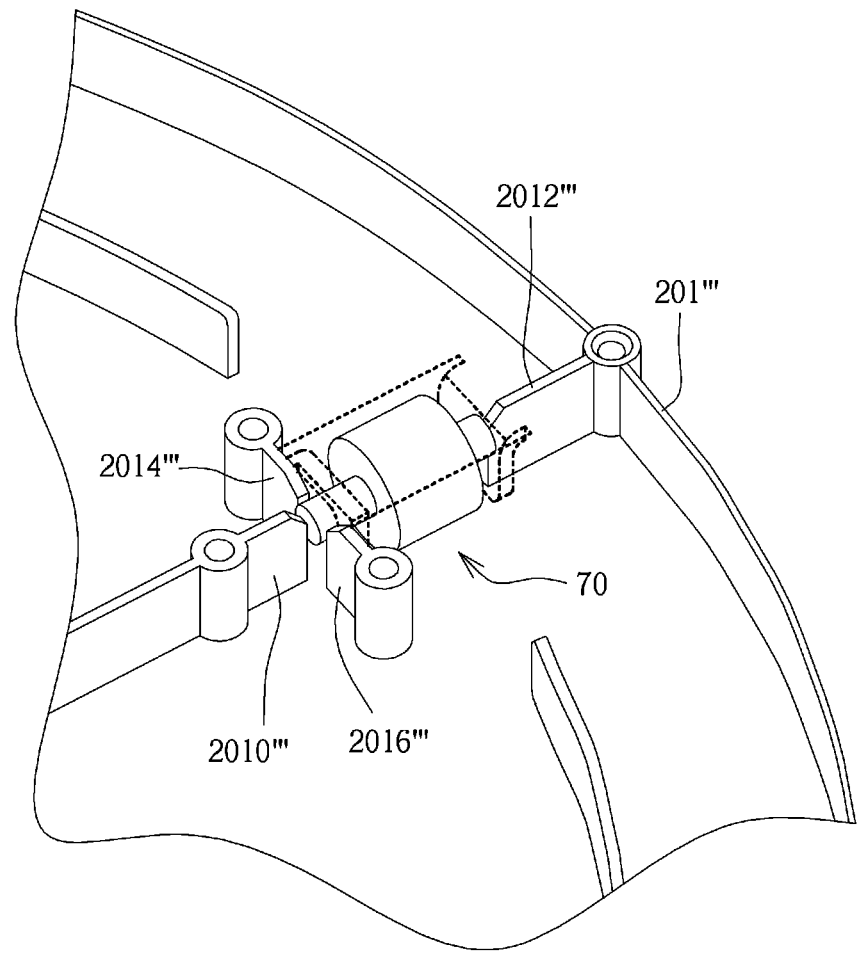
FIG. 20 is a diagram of the roller of the rotating mechanism disposed between the first cover and the second cover according to the fourth embodiment of the present disclosure.

Please refer to FIG. 16 to FIG. 20. FIG. 16 is a schematic diagram of a rotating mechanism 1''' according to a fourth embodiment of the present disclosure. FIG. 17 is an exploded diagram of a base 20''' of the rotating mechanism 1''' according to the fourth embodiment of the present disclosure. FIG. 18 is a diagram of a roller 70 and a second cover 203''' of the rotating mechanism 1''' according to the fourth embodiment of the present disclosure. FIG. 19 is a partial enlarged diagram of a first cover 201''' of the rotating mechanism 1''' according to the fourth embodiment of the present disclosure. FIG. 20 is a diagram of the roller 70 of the rotating mechanism 1''' disposed between the first cover 201''' and the second cover 203''' according to the fourth embodiment of the present disclosure. The rotating mechanism 1''' includes the first cover 201''' and the second cover 203'''. Different from the aforementioned rotating mechanisms 1, 1', and 1", the first cover 201''' and the second cover 203''' are fixed with each other. A hole 2030''' is formed on the second cover 203'''. The rotating mechanism 1''' further includes the roller 70 disposed between the first cover 201''' and the second cover 203''' and passing through the hole 2030''' to protrude from a side of the second cover 203''' away from the first cover 201'''. The roller 70 includes a shaft 702. In this embodiment, an axial direction of the shaft 702 is substantially parallel to a radial direction of the first cover 201''' or the second cover 203'''. However, it is not limited to this embodiment and depends on practical design demands. Furthermore, in this embodiment, the second cover 203''' includes a first fixing lug 2032''' and a second fixing lug 2034'''. An engaging hole 20321''' is formed on the first fixing lug 2032'''. An engaging slot 20341''' is formed on the second fixing lug 2034'''. A first end 7021 of the shaft 702 engages with the engaging hole 20321''' of the first fixing lug 2032''', and a second end 7023 of the shaft 702 engages with the engaging slot 20341''' of the second fixing lug 2034''', so as to install the shaft 702. Accordingly, the shaft 70 is disposed on the second cover 203''' and along the radial direction of the second cover 203'''. The first cover 201''' includes a first rib 2010''', a second rib 2012''', a third rib 2014''', and a fourth rib 2016'''. The first rib 2010''' and the second rib 2012''' are disposed on a side on the first cover 201''' close to the second cover 203''' along a first direction, i.e., a radial direction of the first cover 201'''. The third rib 2014''' and the fourth rib 2016''' are disposed on the side of the first cover 201''' close to the second cover 203''' along a second direction substantially perpendicular to the first direction. However, the configuration and the number of the first fixing lug 2032''', the second fixing lug 2034''', the first rib 2010''', the second rib 2012''', the third rib 2014''', and the fourth rib 2016''' are not limited to this embodiment. For example, the fixing lugs can be disposed on the first cover 201''', and the ribs can be disposed on the second cover 203'''. That is, the first cover 201''' can include the first fixing lug 2032''' and the second fixing lug 2034'''. The two ends of the shaft 702 of the roller 70 engage with the engaging hole 20321''' of the first fixing lug 2032''' and the engaging slot 20341''' of the second fixing lug 2034''' respectively, so as to install the roller 70 on the first cover 201'''. The second cover 203''' can include the first rib 2010''', the second rib 2012''', the third rib 2014''', and the fourth rib 2016'''.

Besides, the first rib 2010''' and the second rib 2012''' are disposed oppositely and spaced from each other in a first predetermined distance D1. The first predetermined distance D1 is slightly greater than a length L of the shaft 702 of the roller 70 for restraining a sliding displacement of the roller along the first direction, i.e., the radial direction of the first cover 201''', when the roller 70 rotates. The third rib 2014''' and the fourth rib 2016''' are disposed oppositely and spaced from each other in a second predetermined distance D2. The second predetermined distance D2 is slightly greater than a diameter D of the shaft 702 of the roller 70 for restraining a sliding displacement of the roller along the second direction when the roller 70 rotates. Accordingly, the roller 70 is rotatably disposed between the first cover 201''' and the second cover 203'''. The rotating mechanism 1''' further includes at least one cushion 30''' installed on a side of the second cover 203''' close to the supporting surface 92. The cushion 30''' provides a friction force, such that the first cover 201''' and the second cover 203''' are rotatable around the cushion 30''' cooperatively and relative to the supporting surface 92. In such a way, when the supporting stand 10 is rotated, since the first cover 201''' and the second cover 203''' are fixed to each other, the first cover 201''' and the second cover 203''' can rotate around the cushion 30''' cooperatively and relative to the supporting surface 92 by the roller 70, so as to rotate the screen 91.

In summary, the rotating mechanism of the present disclosure utilizes the base capable of rotating relative to the supporting surface for driving the screen to rotate relative to the supporting surface. The rotating mechanism has advantages of easy operation, simple structure, and enhanced strength, which solves the problems of easy wear-out and short service life of a conventional rotating mechanism caused by an overweight screen.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A rotating mechanism used for rotating a screen, the rotating mechanism comprising:
   a supporting stand, a first end of the supporting stand being connected to the screen, the supporting stand supporting the screen; and
   a base placed on a supporting surface for supporting the supporting stand and the screen on the supporting surface, a second end of the supporting stand being fixed on the base, and the base comprising:
      a first cover, the second end of the supporting stand being connected to the first cover; and
      a second cover detachably installed on the first cover and contacting with the supporting surface, wherein at least one of the first cover and the second cover is rotatable relative to the supporting surface.

2. The rotating mechanism of claim 1, wherein an opening is formed on the first cover, and the second end of the supporting stand passes through the opening.

3. The rotating mechanism of claim 1, wherein the first cover is rotatably connected to the second cover, the second end of the supporting stand is fixed on the first cover, the rotating mechanism further comprises at least one cushion installed on a side of the second cover close to the supporting surface, and the at least one cushion provides a friction force, such that the second cover is fixed on the supporting surface and restrained from rotating relative to the supporting surface when the first cover rotates relative to the supporting surface.

4. The rotating mechanism of claim 3, further comprising:
   a blocking column disposed on one of the first cover and the second cover; and
   a restraining blocking portion disposed on the other one of the first cover and the second cover, the restraining blocking portion stopping the blocking column for restraining a rotating angle between the first cover and the second cover when the second cover rotates relative to the first cover.

5. The rotating mechanism of claim 4, further comprising an angle compensating and restraining member disposed between the first cover and the second cover, the angle compensating and restraining member comprising:
   a first engaging structure cooperative with the blocking column, and the blocking column being installed inside the first engaging structure, such that the blocking column abuts against a side of the first engaging structure when the second cover rotates relative to the first cover; and
   a second engaging structure cooperative with the restraining blocking portion, the restraining blocking portion abutting against a side of the second engaging structure when the second cover rotates relative to the first cover.

6. The rotating mechanism of claim 4, wherein the first cover comprises a top cover and a bottom plate connected to the top cover, a circular hole is formed on the bottom plate, a circular slot is formed on the top cover and corresponding to the circular hole, the restraining blocking portion is disposed on an inner periphery of the circular slot, the second cover comprises a bottom cover and a circular column connected to the bottom cover, the blocking column is disposed on an outer periphery of the circular column, and the circular column passes through the circular hole and rotatably engages with the circular slot, such that the first cover is rotatable relative to the second cover.

7. The rotating mechanism of claim 3, wherein a restraining slot is disposed on one of the first cover and the second cover, a restraining protrusion is disposed on the other one of the first cover and the second cover, when the first cover is combined with the second cover, the restraining protrusion slidably engages with the restraining slot, such that the first cover is rotatable relative to the second cover.

8. The rotating mechanism of claim 7, wherein the restraining slot is a partial arc structure for restraining a rotating angle between the second cover and the first cover.

9. The rotating mechanism of claim 2, wherein the second cover is rotatably connected to the first cover, the second end of the supporting stand passes through the opening to fix on the second cover, the rotating mechanism further comprises at least one cushion installed on a side of the first cover close to the supporting surface, an accommodating slot is formed on a side of the first cover close to the second cover, the second cover is rotatably accommodated inside the accommodating slot, and the at least one cushion provides a friction force, such that the first cover is fixed on the supporting surface and restrained from rotating relative to the supporting surface when the second cover is rotatable relative to the supporting surface.

10. The rotating mechanism of claim 2, wherein the first cover and the second cover are fixed to each other, a hole is formed on the second cover, the rotating mechanism further comprises a roller disposed between the first cover and the second cover and passing through the hole to protrude from a side of the second cover away from the first cover, the roller comprises a shaft, and an axial direction of the shaft is substantially parallel to a radial direction of the first cover or the second cover.

11. The rotating mechanism of claim 10, wherein the rotating mechanism further comprises at least one cushion installed on a side of the second cover close to the supporting surface, and the at least one cushion provides a friction force, such that the first cover and the second cover are rotatable around the at least one cushion cooperatively and relative to the supporting surface.

12. The rotating mechanism of claim 11, wherein the second cover comprises a first fixing lug and a second fixing lug, an engaging hole is formed on the first fixing lug, an engaging slot is formed on the second fixing lug, a first end of the shaft engages with the engaging hole of the first fixing lug, and a second end of the shaft engages with the engaging slot of the second fixing lug.

13. The rotating mechanism of claim 12, wherein the first cover comprises a first rib, a second rib, a third rib, and a fourth rib, the first rib and the second rib are disposed on a side of the first cover close to the second cover and along a first direction, the third rib and the fourth rib are disposed on the side of the first cover close to the second cover and along a second direction substantially perpendicular to the first direction, the first rib and the second rib are disposed oppositely and spaced from each other in a first predetermined distance, the first predetermined distance is slightly greater than a length of the shaft of the roller for restraining a sliding displacement of the roller along the first direction when the roller rotates, the third rib and the fourth rib are disposed oppositely and spaced from each other in a second predetermined distance, the second predetermined distance is slightly greater than a diameter of the shaft of the roller for restraining a sliding displacement of the roller along the second direction when the roller rotates.

14. The rotating mechanism of claim 11, wherein the first cover comprises a first fixing lug and a second fixing lug, an engaging hole is formed on the first fixing lug, an engaging slot is formed on the second fixing lug, a first end of the shaft engages with the engaging hole of the first fixing lug, and a second end of the shaft engages with the engaging slot of the second fixing lug.

15. The rotating mechanism of claim 14, wherein the second cover comprises a first rib, a second rib, a third rib, and a fourth rib, the first rib and the second rib are disposed on a side of the second cover close to the first cover and along a first direction, the third rib and the fourth rib are disposed on the side of the second cover close to the first cover and along a second direction substantially perpendicular to the first direction, the first rib and the second rib are disposed oppositely and spaced from each other in a first predetermined distance, the first predetermined distance is slightly greater than a length of the shaft of the roller for restraining a sliding displacement of the roller along the first direction when the roller rotates, the third rib and the fourth rib are disposed oppositely and spaced from each other in a second predetermined distance, and the second predetermined distance is slightly greater than a diameter of the shaft of the roller for restraining a sliding displacement of the roller along the second direction when the roller rotates.

16. A display device comprising:
a screen; and
a rotating mechanism connected to the screen for rotating the screen, the rotating mechanism comprising:
   a supporting stand, a first end of the supporting stand being connected to the screen, the supporting stand supporting the screen; and
   a base placed on a supporting surface for supporting the supporting stand and the screen on the supporting surface, a second end of the supporting stand being fixed on the base, and the base comprising:
      a first cover, the second end of the supporting stand being connected to the first cover; and
      a second cover detachably installed on the first cover and contacting with the supporting surface, wherein at least one of the first cover and the second cover is rotatable relative to the supporting surface.

17. The rotating mechanism of claim 16, wherein an opening is formed on the first cover, and the second end of the supporting stand passes through the opening.

18. The rotating mechanism of claim 16, wherein the first cover is rotatably connected to the second cover, the second end of the supporting stand is fixed on the first cover, the rotating mechanism further comprises at least one cushion installed on a side of the second cover close to the supporting surface, and the at least one cushion provides a friction force, such that the second cover is fixed on the supporting surface and restrained from rotating relative to the supporting surface when the first cover rotates relative to the supporting surface.

19. The rotating mechanism of claim 18, further comprising:
a blocking column disposed on one of the first cover and the second cover; and
a restraining blocking portion disposed on the other one of the first cover and the second cover, the restraining blocking portion stopping the blocking column for restraining a rotating angle between the first cover and the second cover.

20. The rotating mechanism of claim 19, further comprising an angle compensating and restraining member disposed between the first cover and the second cover, the angle compensating and restraining member comprising:
a first engaging structure cooperative with the blocking column, and the blocking column being installed on an inner periphery of the first engaging structure, such that the blocking column abuts against aside of the first engaging structure when the second cover rotates relative to the first cover; and
a second engaging structure cooperative with the restraining blocking portion, the restraining blocking portion abutting against a side of the second engaging structure when the second cover rotates relative to the first cover.

21. The rotating mechanism of claim 19, wherein the first cover comprises a top cover and a bottom plate connected to the top cover, a circular hole is formed on the bottom plate, a circular slot is formed on the top cover and corresponding to the circular hole, the restraining blocking portion is disposed on an inner periphery of the circular slot, the second cover comprises a bottom cover and a circular column connected to the bottom cover, the blocking column is disposed on an outer periphery of the circular column, and the circular column passes through the circular hole and rotatably engages with the circular slot, such that the first cover is rotatable relative to the second cover.

22. The rotating mechanism of claim 18, wherein a restraining slot is disposed on one of the first cover and the second cover, a restraining protrusion is disposed on the other one of the first cover and the second cover, when the first cover is combined with the second cover, the restraining protrusion slidably engages with the restraining slot, such that the first cover is rotatable relative to the second cover.

23. The rotating mechanism of claim 22, wherein the restraining slot is a partial arc structure for restraining a rotating angle between the second cover and the first cover.

24. The rotating mechanism of claim 17, wherein the second cover is rotatably connected to the first cover, the second end of the supporting stand passes through the opening to fix on the second cover, the rotating mechanism further comprises at least one cushion installed on a side of the first cover close to the supporting surface, an accommodating slot is formed on a side of the first cover close to the second cover, the second cover is rotatably accommodated inside the accommodating slot, and the at least one cushion provides a friction force, such that the first cover is fixed on the supporting surface and restrained from rotating relative to the supporting surface when the second cover is rotatable relative to the supporting surface.

25. The rotating mechanism of claim 17, wherein the first cover and the second cover are fixed to each other, a hole is formed on the second cover, the rotating mechanism further comprises a roller disposed between the first cover and the second cover and passing through the hole to protrude from a side of the second cover away from the first cover, the roller comprises a shaft, a axial direction of the shaft is substantially parallel to a radial direction of the first cover or the second cover.

26. The rotating mechanism of claim 25, wherein the rotating mechanism further comprises at least one cushion installed on a side of the second cover close to the supporting surface, and the at least one cushion provides a friction force, such that the first cover and the second cover are rotatable around the at least one cushion cooperatively and relative to the supporting surface.

* * * * *